Jan. 10, 1928.
I. A. CUNLIFF
PISTON RING COMPRESSOR
Filed Jan. 10, 1927
1,655,595
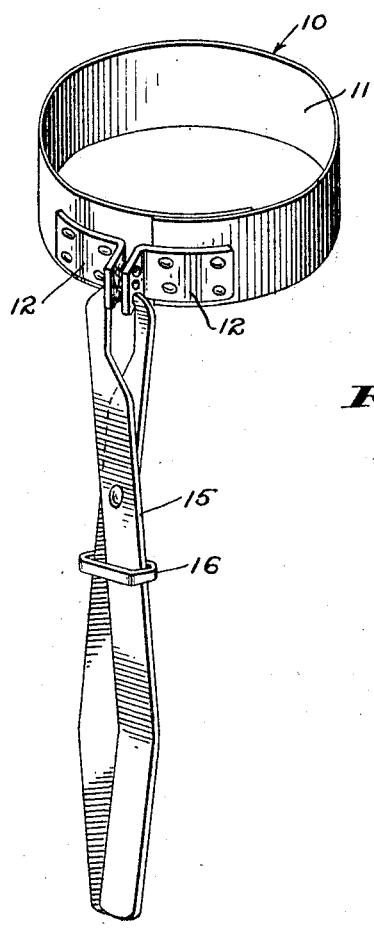
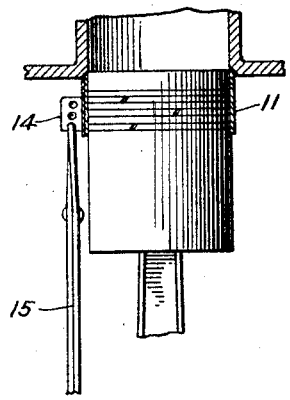
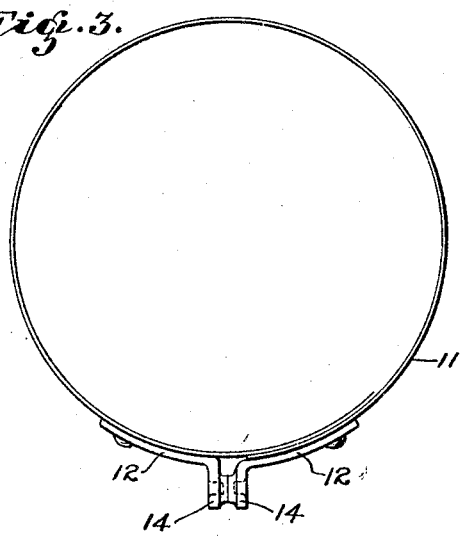
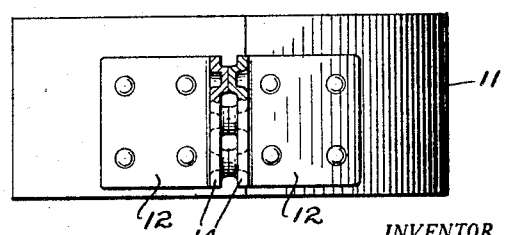
INVENTOR.
Irving A. Cunliff
BY
Townsend, Loftus & Abbett
ATTORNEYS.

Patented Jan. 10, 1928.

1,655,595

UNITED STATES PATENT OFFICE.

IRVING A. CUNLIFF, OF OAKLAND, CALIFORNIA.

PISTON-RING COMPRESSOR.

Application filed January 10, 1927. Serial No. 160,067.

This invention relates to devices for compressing piston rings on pistons.

It is the principal object of the present invention to generally improve devices of the character referred to whereby to provide a simple and inexpensive piston ring compressing device for facilitating the insertion of pistons into their cylinders, which device is capable of operation on pistons of various diameters and may be advantageously used wherein the working space in the engine is limited.

In carrying out the invention into practice, I provide a contractile band which may be arranged about the ring area of a piston and contracted by means of a pair of tongs to compress the rings. The connection between the tongs and the band is such that the pressure may be applied at the proper point and permits the tongs to be readily detached from the band to facilitate the operation of the device under certain circumstances.

One form which the invention may assume is exemplified in the following description and illustrated by way of example in the accompanying drawings, in which:

Fig. 1 is a perspective view of a piston ring compressing device embodying the preferred form of my invention.

Fig. 2 is a diagrammatic view showing the compressing device used in compressing the rings on a piston as the latter is about to be inserted in the bottom of a cylinder.

Fig. 3 is a plan view of the contractile band showing the manner in which the clamping clips are mounted thereon.

Fig. 4 is a side elevation of the band showing the clips thereon with the latter partly in section disclosing certain features of construction.

Referring more particularly to the accompanying drawings 10 indicates a piston ring compressing device for use in contracting the piston rings on a piston when inserting the latter into its cylinder. The device mentioned comprises a circular band 11 of thin flat spring steel which normally assumes a diameter somewhat larger than that of the rings to be compressed. The ends of the band are not connected and overlap so that the band 11 may be contracted to the desired diameter when compressing rings. It will be noticed from Fig. 2 that the band 11 is of a width which is greater than the ring area of the piston so that it will contract all of the rings on the piston simultaneously.

At the ends of the band 11 I mount a pair of clips 12 which are riveted or otherwise firmly attached to the outer peripheral surface of the band, one clip being secured to each end of the band. These clips 12 are oppositely disposed and are formed with radially projecting portions 14 which extend outwardly and are adapted to abut when the band is fully contracted.

The clip 12 on the outer end of the band 11 is secured closely adjacent to the end of the band, while the clip 12 on the other or inner end of the band is secured at a distance from the end so that the ends of the band will overlap even though the clips are spaced apart. This permits the band to be used on pistons of different diameters within a certain range with equal efficiency. The clips are also arranged closer to one edge of the band than the other, leaving a wide margin at one edge and a narrow margin at the other. This is to permit the band to be used when inserting the piston either at the bottom of the cylinder or at the top thereof, as will be described.

To contract the band 11 I provide tongs 15 which are formed of flat metal bars, which are slightly offset at their gripping ends so that these latter ends will aline as shown in Fig. 2. At their gripping ends the tongs 15 are recessed slightly and provided at their extremities with inturned projections which are adapted to engage recesses formed in the sides of the clips 12.

There are three pairs of recesses in the clip, the recesses of each pair alining as disclosed in Fig. 4. By providing three pairs of recesses, the strain may be placed upon the band at three different points. This is advantageous as it permits the pressure to be applied exactly at the point where it is needed when compressing rings.

Slidably mounted on the tongs below their pivotal point is a retaining member 16. This retaining member is formed with an opening conforming somewhat in configuration to the cross-section through the tongs below the pivotal point thereof. It is somewhat longer than the width of the tongs so that it may slide vertically thereon. As the tongs are comparatively straight for a major portion of their length, they will diverge outwardly from their pivotal point. Thus, when the tongs are compressed the retaining member 16 may be moved therealong until it grips the side edges of the tongs and hold the band in compressed position.

In operation of the device the band is arranged on the piston around the rings to be compressed and one of its edges is alined with the cylinder opening. The piston is then forced through the band into the cylinder. The band really forms a continuation of the cylinder wall so that the piston may be transferred easily from the band into the cylinder.

In order that the pressure may be applied at the desired point, the tongs may be engaged with either of the three pairs of recesses in the clips 12 as the gripping ends of the tongs are detachably connected with these recesses.

In inserting the piston from the bottom of the cylinder the wide margin thereon is placed contiguous to the end of the cylinder with the edge of the piston nesting within the chamfer at the lower end of the cylinder. When the rings are fully compressed the entire diameter of the band will be almost equal to that of the cylinder, so that the piston may be easily transferred from the band to the cylinder. In this operation the tongs may be arranged vertically in alinement with the piston. As soon as the piston is inserted into the cylinder the tongs are disengaged from the band and the latter is removed from the piston.

In case there is insufficient room for the piston and tongs to be run up through the crankcase to the cylinder together, the band may be arranged on the piston and the piston moved through the crankcase to a point adjacent the lower end of the cylinder. The tongs may then be inserted up through the chankcase from a convenient angle to evade the mechanism therein, and engaged with the clips 12 to compress the ring. This is one of the advantages of having the tongs detachably connected with the band. The second advantage is that the tongs may be used with different sized bands as hereinafter described.

In inserting the piston through the top of the cylinder the narrow marginal edge of the band is arranged contiguous to the end of the cylinder, and the piston transferred therefrom into the cylinder. Due to the fact that the gripping portions of the tongs are detachably and rotatably connected with the clips 12 on the band, the tongs may be held in any convenient position while performing the operation.

It should be stated that one band may be provided for different series of pistons, one band accommodating all pistons within an inch or so of the same diameter. Therefore, by providing a set of bands of different diameters with one pair of tongs a compressing device for piston rings will be provided which will accommodate pistons of all sizes.

While I have shown the preferred form of by invention, it is to be understood that various changes may be made in its construction by those skilled in the art without departing from the spirit of the invention as defined in the appended claims.

Having thus described my invention, what I claim and desire to secure by Letters Patent is:

1. A piston ring compressing device comprising a circular band formed of wide thin spring material, said band being normally expanded but capable of being contracted, said band having disconnected overlapping ends, clips secured on the ends of the band and having outwardly extending radial projections, said clips being formed with alined recesses spaced apart across the width of the band, and tongs having gripping means adapted to detachably engage either of said sets of recesses to compress the band.

2. A piston ring compressing device comprising a circular band formed of wide thin spring material, said band being normally expanded but capable of being contracted, said band having disconnected overlapping ends, clips secured on the ends of the band and having outwardly extending radial projections, said clips being formed with alined recesses spaced apart across the width of the band, tongs having gripping means adapted to detachably engage either of said sets of recesses to compress the band, and retaining means arranged on the tongs to grip the same when the band is contracted to hold the tongs and maintain the band contracted.

IRVING A. CUNLIFF.